3,379,112
IRRADIATION DEVICE AND MORE PARTICU-
LARLY EXPOSURE DEVICE
Georg Cranskens, Wedel, Germany, assignor to Lumo-
print Zindler KG, Hamburg, Germany
Filed July 7, 1965, Ser. No. 470,169
Claims priority, application Germany, July 15, 1964,
L 48,297
13 Claims. (Cl. 95—77.5)

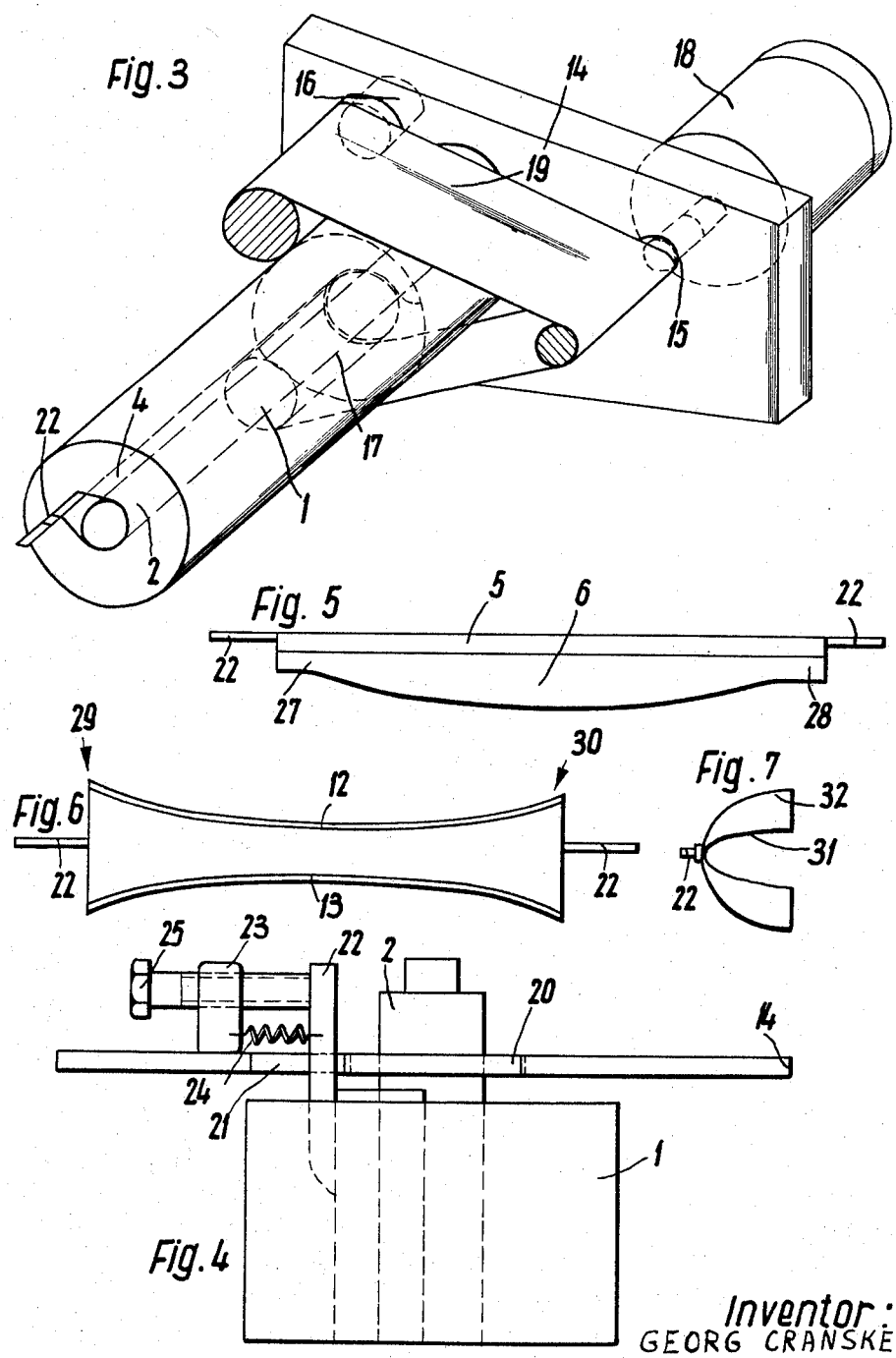

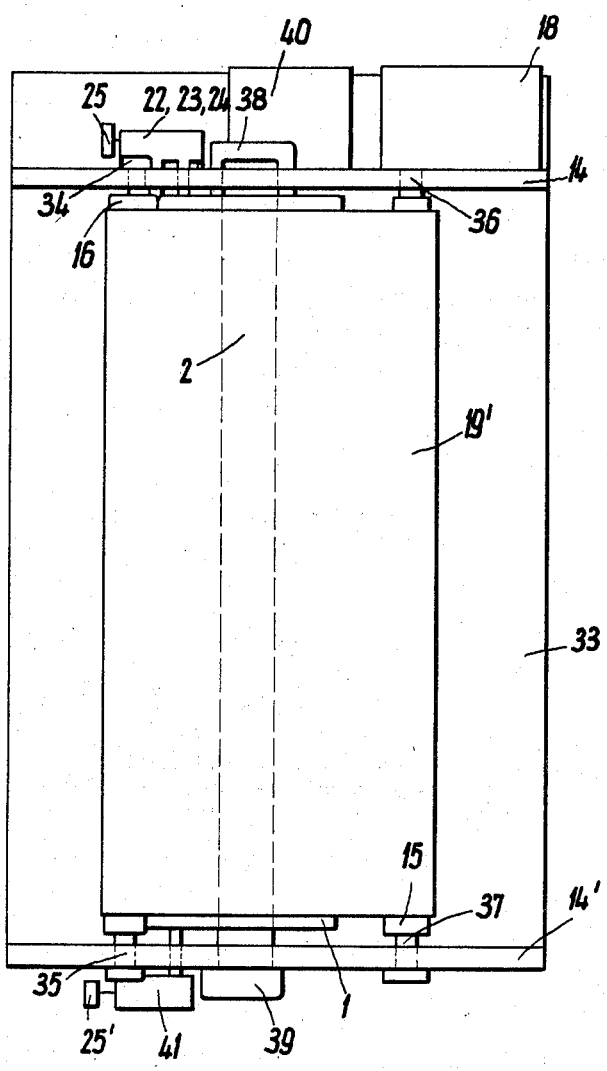

ABSTRACT OF THE DISCLOSURE

An exposure device for a copying apparatus is formed of a frame supporting a radiation permeable guiding surface with guide means for moving material over the surface. Mounted on the frame is a radiation source, for example, a light or a heat source, for directing radiation through the guiding surface to the material passing over it. A shutter or reflector for the radiation source is located within the frame and is movably positionable in a rectilinear direction between a pair of limiting positions. The shutter has a generally U-shaped configuration with the opening formed between its outstanding legs directed toward the guiding surface. In one of its limiting positions the shutter partly encloses the radiation source while in its other limiting position the shutter is spaced away from the radiation source and is located an increased distance from the guiding surface. The shutter is selectively positionable between the two limiting positions for varying the intensity of the radiation directed to the guiding surface. In one embodiment the length and/or the spacing of the legs of the U-shaped shutter vary along the length of the shutter for achieving uniform intensity of radiation from the overall length of the radiation source.

---

The invention relates to an irradiation device, and more particularly to an exposure device for copying apparatus, comprising a radiation source which is arranged stationarily, especially relative to a surface to be illuminated and which is associated with adjustable shutter means, at least partly surrounding the said radiation source and arranged on the side of the radiation source remote from the said surface.

It is known in a copying device to locate a unit comprising a parabolic reflector and a lamp by means of a ball joint in such a manner that it can be inclined in any desired direction, whilst there are also provided facilities for moving the entire unit towards or from an exposure plane.

There is also known in the art a continuous exposure device comprising a fluorescent lamp, the distance of which from the exposure plane is variable and which is so arranged on a pivotable carrier and equipped with a shutter strip on the side facing the exposure plane that the shutter strip is moved as a function of the pivotal position more or less directly between the said fluorescent tube and the exposure plane.

All these constructions have the common disadvantage that the light or radiation source must be movable. More particularly, in the last-mentioned construction a comparatively wide pivoting range is required so that also the space required for the device is very large.

For this reason, continuous exposure devices with tubular light sources arranged in a glass cylinder use usually adjustable shutter means, forming a part of the cylinder shell and adapted to be moved by rotation to a greater or lesser extent between the light source and the exposure plane. This construction presupposes a shutter executed in several parts and is based on the principle of removing a shutter between the light source and the exposure plane. This construction does not improve the luminous output by utilizing the reflective properties of a shutter. In addition thereto, also the possibilities for adjustment are limited and the more or less complete encasement of the radiation source causes the same to be additionally heated.

The present invention has therefore the object of providing a radiation source of simple construction and permitting the regulating of the magnitude of the irradiated field in a simple manner.

It is a further object of the invention to provide a radiation source of the kind hereinbefore described which permits at the same time a control of the intensity of the emitted radiation.

It is yet another object of the invention to provide an exposure device for copying material, comprising a movable shutter means, wherein movement of the said shutter means both controls the exposure range in the longitudinal direction relative to the direction of movement of the copying material, but affects simultaneously also the light output.

According to the present invention, these objects are realized in that the shutter is displaceable relative to the light source substantially along a center axis intersecting the shutter body and the radiation source in order to regulate the radiation output as a function of the variable distance between shutter and radiation source.

This solution avoids primarily the difficulties caused by the movable mounting of a light or other radiation source from the point of view of the connections thereof. Moreover, compared with known shutters on stationary light sources, the two-part construction, consisting usually of a reflector and an adjustable shutter element, is also avoided, since, according to the invention, the shutter acts simultaneously as reflector.

Variation in the distance between this shutter and the radiation source changes the issue of light within wide limits because the angle of reflection changes from a smaller value to a larger value between a narrow position and a wide position relative to the radiation source.

In addition thereto, the shutter acts as reflector which may be so constructed that in one position of the reflector, for example in its most remote position, the radiation source is located in the focus of of a reflector with parabolic cross-section so that in this position the reflection to a surface to be irradiated is strongest, whilst in the other positions the reflector absorbs gradually increasing parts of the radiation.

In this conjunction, there is also the possibility of selecting other than parabolic reflector cross-sections, wherein the radiation source is arranged in the focus of an ellipse, the other focus of which is in the plane of the surface.

Applied to a tubular radiation source, such as is known for exposure devices for copying machines, the invention comprises an oblong shutter with substantially U-shaped cross-section, wherein the gap between the legs of the U is larger than the diameter of the radiation source and their length is such that they can cover the radiation source at different sides.

The term "substantially U-shaped cross-section" comprises the embodiment hereinafter described as well as embodiments after the manner of a letter U and the semi-elliptical or parbolic cross-sections already mentioned.

According to a preferred embodiment of the invention the width of the legs of the U-shaped shutter is such that the shutter can be moved at least so far towards the radiation source that a line between the free ends of the shutter forms a tangent to the radiation source on the side remote from the shutter.

According to another embodiment of the invention, this position is the position in which the shutter is in its most remote position from the radiation source whilst in its less remote positions the edges of the reflector extend further beyond the radiation source.

According to yet another preferred embodiment of the invention, the shutter with substantially U-shaped cross-section consists of a substantially V-shaped main part to which are connected rectilinear legs.

Since, in the present invention, the shutter, movable relative to the radiation source and serving as reflector is used for regulating the radiation output and more particularly the luminous output, according to a preferred embodiment the inside of the shutter is equipped with surface sections having different reflective properties in order to provide a definite control curve. Surfaces with different reflecting properties may thus be arranged successively over the length of the shutter, or preferably symmetrically relative to the centre line thereof. Obviously the arrangement may also be such that surface sections extending successively over the depth of the shutter may have differently reflecting surfaces. These differently reflecting surfaces may comprise colours ranging from black to white, as well as a mirror-facing.

According to another embodiment, and with a view to producing a definite control curve, the legs of the shutter have different lengths and/or profiles. Particularly with the use of a fluorescent tube as oblong source of radiation, the legs of the shutter are preferably narrower towards the ends of the shutter. In addition, the legs may have uniform continuous width and may be profiled by providing arcuate portions. In addition thereto, the legs of the shutter have a comb-like profile at least over some sections thereof.

In an apparatus in which the said surface has the form of a glass cylinder, the shutter protrudes on both sides from the cylinder and rests with its projecting ends in mounting walls equipped with adjusting devices for displacing the projecting ends. This is in principle an application of a known exposure device, but in a form in which a stationary light source without reflector is associated with only one additional shutter element which, moreover, prevents in all its positions the escape of light rays towards the operating side of said exposure device.

Further features and advantages of the present invention will become apparent from the ensuring description, given by way of example, with reference to the accompanying drawings, and from the claims appended hereto. In the drawings:

FIG. 3 is a partial view in perspective of an irradiation device according to the invention;

FIG. 4 is a partial top view of an arrangement according to FIG. 3 explaining the adjusting facilities for the shutter;

FIG. 5 is a top view of a detail of another embodiment of the shutter;

FIG. 6 is an end elevation of a shutter, viewed from the concave side;

FIG. 7 is a side elevation of the shutter of FIG. 6; and

FIG. 8 is a top view of a frame with a device according to the invention.

In all figures, identical or equivalent parts are marked with the same reference numerals.

Figure 1:
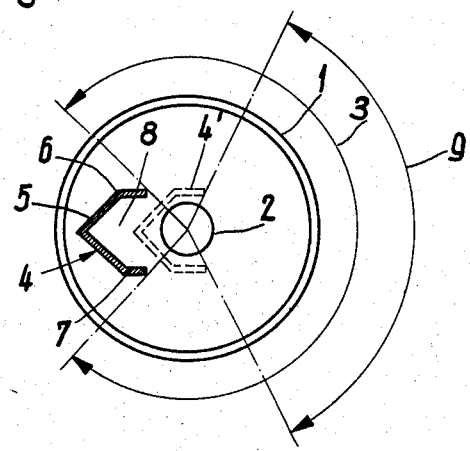
FIG. 1 is a side elevation of a preferred embodiment of the invention with an irradiation cylinder, showing only the components necessary for the understanding of the operation of the device.
Figure 2:
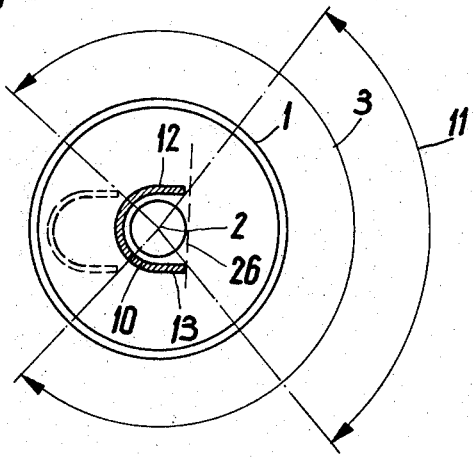
FIG. 2 is a side elevation, similar to FIG. 1, but showing another type of shutter.

FIGS. 1 and 2 show a rotatable cylinder 1 of glass or synthetic resin, permeable to the radiation, within which is arranged a stationary, cylindrical source of radiation 2, such as, for example, a quartz-iodide lamp. The ratio scale in FIG. 1 is about 1:1 for a continuous copying device.

In both FIG. 1 and 2, the lamp radiates towards the right. The copying materials are guided over the right peripheral part of the cylinder and the extent of contact with the cylinder, suspended in at least one resilient band loop, is indicated substantially by the angle 3.

Since the invention is here explained with reference to a particularly preferred embodiment, it may also be seen that the space available for the shutter arangement is very small; for this reason, devices to which the invention is particularly applicable have used hitherto shutter elements in the form of sections of a cylindrical shell which were rotatable about the radiation source 2 concentrically to the cylinder.

According to FIG. 1, there is provided a shutter 4 having substantially U-shaped cross-section and consisting of an angled web portion 5 and two parallel legs 6 and 7, connected to the centre web 5. In the position 4 drawn in solid lines, the shutter is in its most remote position from the radiation source 2. As may be seen clearly, in this position the peripheral part of the cylinder 1 not covered by the angle 3 is screened.

The shutter may be moved along the axis 8 towards the source of the radiation. In the position 4' drawn in dotted lines, the shutter is in the proximate position or limit position relative to the light source. In this position 4', the legs 6, 7 extending substantially in the direction of the movement, overlie the light source 2 on opposite sides thereof. Radiation is possible only over the extent indicated by an angle 9.

FIG. 2 shows in solid lines a shutter 10 in its proximate position to a light source 2; this shutter has U-shaped cross-section and may therefore be moved with its closed part nearer to the source of radiation. In consequence, the smallest angle of emergence 11 is smaller than the corresponding angle 9 in FIG. 1. The free ends of the legs 12, 13 of the shutter 10 are so long that the imaginary line connecting their free ends forms a tangent 26 to the right side of the radiation source in FIG. 2.

For maximum utilization, therefore, the closed end of the shutter is of a configuration concentric to the cross-section of the source of radiation.

In embodiments, in which the radiation source is a light source, shutters of the shape hereinbefore described are preferably used. Where the source of radiation is a source of heat, the invention comprises with special advantage the parabolic or semi-elliptic cross-sections hereinbefore described, in order to concentrate the thermal radiation in a certain position of the shutter on a definite section or line of the cylinder 1. However, this feature may also be used in conjunction with a light source.

A comparison between FIGS. 1 and 2 shows that different angles of emergence can be controlled by selecting the shutter cross-section whilst the space available and the amount of travel remain unchanged.

Where a tubular light source is used, the light yield towards the ends of the light source is generally smaller. According to the invention, this drawback may be easily eliminated in that the legs 6, 7 and 12, 13, respectively, of the shutters become shorter towards the shutter ends or are more widely spaced at the ends.

FIG. 5 shows, by way of example, a top view of a shutter having a cross-section according to FIG. 1. It may be seen that the upper leg 6 of the shutter, the web portion of which is shown at 5, decreases in width towards the ends as at 27 and 28. In addition, FIG. 5 also shows the supporting arms 22 on the shutter body, which will be described further below.

FIG. 6 shows, also by way of example, a shutter having a cross-section according to FIG. 2, that is to say, a shutter with U-shaped cross-section, having legs 12 and 13. As shown in FIG. 6, the legs 12 and 13 diverge towards the ends of the shutter as at 29 and 30. Also here the supporting arms 22 are shown.

FIG. 7 shows that the cross-section 31 in the centre zone is narrower than the cross-section 32 at the ends at 29 and 30.

FIG. 3 shows the assembly of the device, wherein only the side mounting wall 14 is shown of the frame, whilst the forward mounting wall has been omitted for the sake of clarity. Three rollers 15, 16, 17 are rotatably mounted in this wall 14. One of these rollers, for example, the roller 15, may be driven by a motor 18 which is mounted on the wall 14. One or more belts 19 are so looped over the rollers that they embrace the cylinder 1 and urge it towards the rollers 16 and 17, causing the cylinder 1 to be entrained during the movement of the belts. The mounting walls are equipped with orifices 20 (FIG. 4) adapted to receive the ends of the radiation source or to act as bearings therefor. Adjacent to the said orifices 20 are further orifices 21 through which extend the supporting arms 22 of the shutter 4. These arms 22 may be mounted, for example, on pivoting levers extending perpendicularly to the shutter and pivotably mounted on the mounting walls 14 with their ends remote from the shutter. In this case, the orifices 21 would have the shape of slightly arcuate slots.

FIG. 4 is a partial view of another embodiment on a strongly enlarged scale, showing only the cylinder 1 and the associated components adjacent to a mounting wall 14. In this embodiment, the supporting arms 22 have, at least within the region of the mounting wall 14, flat, strip-shaped profile. The orifice 21 is also slot-shaped and acts as guide, having a length corresponding to the travel of the shutter. On the outside of the mounting wall 14 there is a mounting lug 23; a tension spring 24 is arranged between this lug 23 and the protruding supporting arm 22. An adjusting screw 25 is screwably located in a threaded bore in the mounting lug 23 and acts with its end on the supporting arm 22 so that rotation of the screw alters the adjustment of the supporting arm in the slot. Both sides of the device may be provided with markings in order to ensure the parallel adjustment.

A whole frame is shown in FIG. 8. Since it relates substantially to the embodiment of FIGS. 3 and 4, the same reference numerals are used for identical parts, whilst the parts omitted in FIG. 3 and located on the other side of the apparatus, are marked with a prime (').

The frame has a base plate 33 with mounting walls 14, 14'. The bearing means 34, 35 for the roller 16 and the bearing means 36, 37 for the roller 15 may also be seen. In this case a cloth 19' is used. The radiation source 2 is mounted in supporting and connecting means 38, 39 on the mounting walls 14, 14', and the said connecting means comprise also a unit, comprising switches, transformers and the connection to a source of energy. In the cloth 19', the glass cylinder 1 is located, as hereinbefore described. The adjusting means on the mounting wall 14' are shown generally at 41, whilst the adjusting screw is indicated at 25'.

Having thus fully disclosed the invention, what is claimed as new and is desired to be secured by Letters Patent is:

I claim:

1. A device for irradiating a flat copying material comprising a frame, a radiation permeable guiding surface mounted on said frame and having a first face and an oppositely directed second face, guide means mounted on said frame for guiding the material to be irradiated along the first face of the said guiding surface, at least one source of radiation secured to said frame in a stationary position and located on and spaced from the second face side of said guiding surface, a shutter disposed on the second face side of said guiding surface and adjustably positionable in a rectilinear direction between a first limiting position and a second limiting position, said shutter comprising a web portion facing said guiding surface and a pair of spaced legs extending from said web portion toward said guiding surface and forming an opening therebetween of sufficient size to receive said radiation source, in the first limiting position said shutter partially encloses said source of radiation with said source of radiation located within the opening between said legs of said shutter and in said second limiting position the shutter is rectilinearly displaced away from both said radiation source and said guiding surface with said radiation source located outwardly from the opening in said shutter, whereby said shutter is selectively rectilinearly positionable between its first and second limiting positions for varying the intensity of radiation directed from said radiation source through said guiding surface.

2. A device as set forth in claim 1, wherein said source of radiation is a tubular member and said shutter has a substantially U-shaped cross section, said U-shaped shutter having a curved web portion with said legs extending from said curved portion, the distance between said legs being greater than the diameter of the tubular source of radiation.

3. A device as set forth in claim 2, wherein the length of said legs of said shutter in said first limiting position is such that said legs extend along the opposite sides of said source of radiation and an imaginary line connecting the outstanding ends of said legs forms a tangent to the source of radiation on its side facing said guiding surface.

4. A device as set forth in claim 1, wherein said source of radiation is a tubular member, and said shutter comprises a V-shaped web portion with a pair of parallel legs extending outwardly from the edges of said web portion.

5. A device as set forth in claim 2, wherein said shutter has a concave inner surface and said inner surface is sub-divided into several sections extending in parallel relationship with the longitudinal axis of said shutter, said sections being provided with surfaces having different reflecting properties so as to form a definite control curve.

6. A device as set forth in claim 5, wherein said sections having different reflecting properties are arranged symmetrically relative to the longitudinal center line of said shutter.

7. A device as set forth in claim 2, wherein said legs of said shutter have a variable spacing for the length of the shutter in order to equalize the edge effects of said source of said radiation.

8. A device as set forth in claim 2, whrein said legs of said shutter have different lengths over the length of the shutter.

9. A device as set forth in claim 8, wherein said legs of said shutter have comb-shaped profiles over at least some sections thereof.

10. A device as set forth in claim 1, wherein the spacing of said legs of said shutter is of a lesser dimension at the ends thereof.

11. A device as set forth in claim 2, wherein said guiding surface as a cylinder permeable to radiation and mounted in said frame, lugs secured to said shutter and extending outwardly from both ends of said cylinder, mounting means for the shutter on said frame and said lugs connected to said mounting means.

12. A device as set forth in claim 11, wherein said mounting means are equipped with adjusting means for adjustably positioning said shutter in a rectilinear direction at different distances from said source of radiation.

13. A device as set forth in claim 1, wherein said guiding surface is made of glass and said source of radiation is a light source.

References Cited

UNITED STATES PATENTS 3,143,948   8/1964   Hodges et al. _____ 95—77.5

NORTON ANSHER, *Primary Examiner.*

R. A. WINTERCORN, *Assistant Examiner.*